United States Patent [19]
Poffenberger

[11] 3,847,491
[45] Nov. 12, 1974

[54] APPLIANCE FOR LINEAR BODIES
[75] Inventor: James C. Poffenberger, Cleveland Heights, Ohio
[73] Assignee: Preformed Line Products company, Cleveland, Ohio
[22] Filed: Jan. 12, 1973
[21] Appl. No.: 323,306

Related U.S. Application Data
[63] Continuation-in-part of Ser. No. 190,351, Oct. 18, 1971, abandoned.

[52] U.S. Cl............ 403/209, 24/129 B, 24/115 R, 174/DIG. 12
[51] Int. Cl....................... E16g 11/03, E16g 11/10
[58] Field of Search....... 403/209; 24/115 R, 129 C, 24/131 C, 129 B; 248/63; 174/DIG. 12

[56] References Cited
UNITED STATES PATENTS
3,355,542   11/1967   Finn.................................. 403/209
3,633,252   1/1972   Williams............................ 403/209

Primary Examiner—Bernard A. Gelak
Attorney, Agent, or Firm—Hume, Clement, Brinks, Willian, Olds & Cook, Ltd.

[57] ABSTRACT

A dead-end appliance for securely gripping a cable or the like comprises a first elongated leg portion helically preformed to a first predetermined pitch length for wrapping about the cable in tightly encircling and gripping relation therewith. A second helical leg is of a significantly shorter pitch length and preferably of an opposite hand of lay to that of the first leg. The second leg is wrapped about the cable and first helical leg in tightly encircling and gripping relation. A return bent bight portion joins the first and second legs to complete the structure. A second embodiment comprising the two separate leg portions (i.e., bight omitted) is useful for splicing two co-axially aligned cables. Other features are disclosed.

13 Claims, 8 Drawing Figures

APPLIANCE FOR LINEAR BODIES

CROSS-REFERENCE TO RELATED APPLICATION

The present application is a continuation-in-part of application Ser. No. 190,351, filed Oct. 18, 1971, now abandoned.

INTRODUCTION

The present invention relates generally to appliances for linear bodies and, more particularly, is directed to new and improved helically preformed appliances. A preferred embodiment of the appliance is particularly useful as a dead-end for cable and wire installations wherein only moderate forces are encountered and a simple, economical structure is desired. A second embodiment is useful in the splicing of cable sections. The present invention constitutes an improvement over the structures disclosed and claimed in U.S. Pat. Nos. 3,633,252-Williams et al., and 3,355,542-Finn, both assigned to the same assignee as the present invention.

SUMMARY OF THE INVENTION

It is an objective of the present invention to provide a new and improved helically preformed dead-end and splice-type appliances that assure secure gripping of flexible cables or the like. The appliances are of a highly economical construction and are quite easy to install. One construction is particularly suited for use as a termination or dead-end support in environments where only moderate forces are experienced, for example, for telephone drop wires and the like and is also particularly suited for use with cables of a highly flexible nature and non-circular cross-section. Another embodiment is particularly suited as a splice for abutting and co-axially aligned cable sections.

More particularly, the invention is directed broadly to a helically preformed appliance comprising a first elongated leg portion helically preformed to a first predetermined pitch length. A second elongated leg portion is helically preformed to a second predetermined pitch length different from that of the first leg portion. Preferably, the hands of lay of the two helical legs are opposite to one another. It is also presently preferred that the appliance be constructed of a flat ribbon or strip of material, such as steel. When the appliance is used as a splice, the two legs are separate (i.e., the bight is omitted) and the legs are wrapped in overlying relation about the abutting cable sections to effect a secure cable interconnection.

BRIEF DESCRIPTION OF THE DRAWINGS

The novel features of the present invention are set forth with particuarlty in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
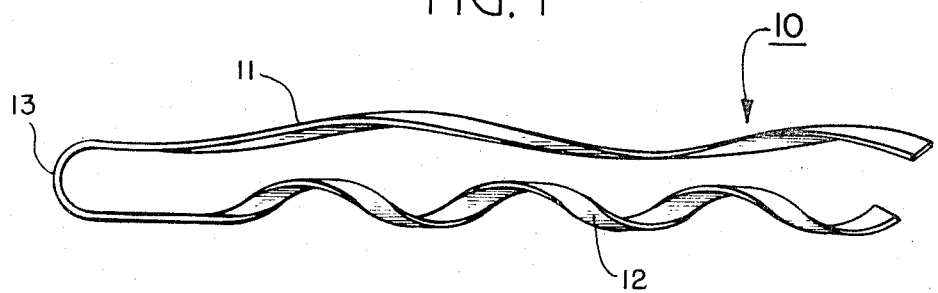
FIG. 1 is a side elevational view of a first embodiment of a helically preformed dead-end constructed in accordance with the present invention and wherein the helical legs are of a like hand of lay.

Referring now to FIG. 1, the helically preformed appliance 10 there illustrated comprises a first elongated leg portion 11 helically preformed to a first predetermined pitch length. A second elongated leg portion 12 of the appliance is helically preformed to a second predetermined pitch length different from that of the first leg 11. In the present embodiment, the helical leg 11 is of a pitch length approximately twice that of the helical leg 12. The structure is completed by a return bent portion 13 which is integral with and joins the first and second legs 11 and 12.

As shown, the appliance 10 is composed of a single element in the form of a flat ribbon or strip of material, such as steel. It will be recognized by those skilled in the art that the device may be fabricated from other materials. It will further be recognized by those skilled in the art that the various prior art teachings with respect to manufacture of helically preformed appliances may readily be applied to effect various modifications of the illustrated appliance 10 and, indeed, such is contemplated by the present invention. For example, a knurling or gritting of those surfaces of appliance 10 that are adapted to engage the cable may be used to effectively enhance the gripping action of the device, as is disclosed and claimed in U.S. Pat. No. 3,183,658-Peterson, assigned to the same assignee as the present invention. Additionally, by way of example, the appliance 10 may, in lieu of a flat strip of steel, be comprised of a single plastic rod or an appropriate grouping of rods such as disclosed and claimed in U.S. Pat. No. 2,761,273-Peterson and assigned to the same assignee as the present invention.

Figure 2:
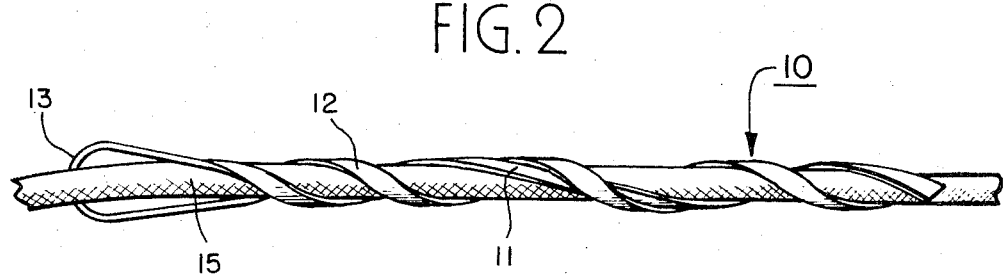
FIG. 2 illustrates the appliance of FIG. 1 as applied to a cable in providing a dead-end support therefor.

Referring now to FIG. 2, the appliance 10 is depicted in assembled relation with a linear body or cable 15. In applying the appliance 10 to the cable 15, the longer pitch leg 11 is first wrapped in conventional fashion about the cable 15 in tightly encircling and gripping relation therewith. After the cable has been locked into the longer pitch leg 11, the helically preformed leg 12 is now applied about both cable 15 and the leg 11 in a tightly encircling relation in the manner illustrated.

It has been found that a secure frictional gripping of the cable 15 is obtained by the combined action of the two helical legs. Specifically, it has been found that the longer pitch leg 11 is rather easily installed about the non-circular and highly flexible cable 15 to provide a body of a relatively uniform and more rigid contour for the helices of the leg 12 grip. The short pitch leg 12 also serves to clamp the surface of the longer pitch leg 11 in tightly gripping relation with the cable 15. The present structure also obviates excessive localized radial pressures that might be encountered with conventional dead-end structures.

Figure 3:
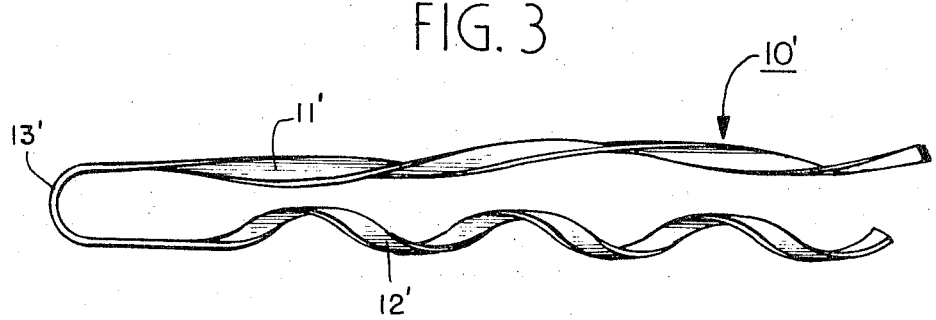
FIG. 3 is a side elevational view of a modified and presently preferred construction of the dead-end appliance of the invention wherein the helical legs are of an opposite hand of lay.
Figure 4:
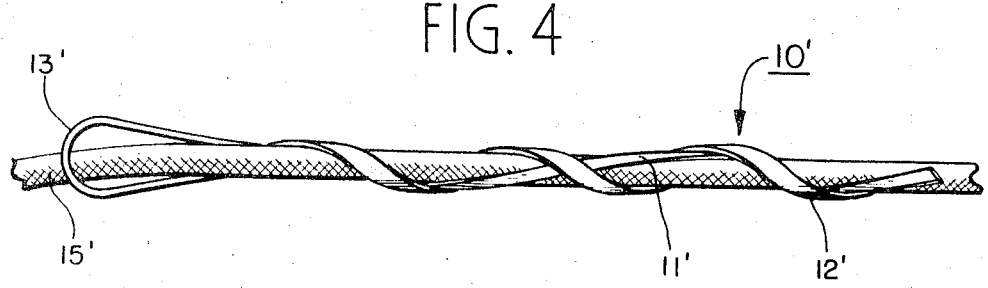
FIG. 4 illustrates the appliance of FIG. 3 as applied to a cable.

A modified, and in fact preferred, form of the deadend of the invention is illustrated in FIG. 3. The embodiment of FIG. 3 is identical to that of FIG. 1 excepting that the helical legs 11' and 12' are of an opposite hand of lay, i.e., the helices spiral in opposite directions. It has been found from actual tests that a greater holding power with a lesser probability of damage to the linear body 15' results from the legs being of an opposite pitch as illustrated. As with the embodiment of FIG. 1, the ratio of the pitch of the two legs may vary widely according to the contemplated environment of use. However, the difference in pitch between the legs should be such as to assure that the shorter pitch leg crosses over and grips the longer pitch leg several times over the length of the appliance. The appliance 10' is illustrated as applied to the cable 15' in FIG. 4. The method of installation is again the same as that previously described in connection with the first embodiment.

Manufacture of the disclosed appliances 10 and 10' is facilitated by forming each of the legs and the bight portion separately and then joining the three elements by welding, clamping or the like. Specifically, the single element repetitive helical leg structures of each appliance are well suited to continuous forming processes, the resultant continuous strips of helical material being cut at periodic intervals to define the individual appliance legs. The appliance bight portions are also well suited for manufacture by continuous forming techniques. Specifically, a continuous and nominally straight strip of material is return bent and is then cut at appropriate intervals to form the appliance bight. Integral assembly of the three appliance components in the manner aforesaid is also easily effected by known automated techniques.

Figure 5A:
FIGS. 5(a) and 5(b) depict the two components of a second embodiment of the invention which embodiment is useful as a cable splice.
Figure 5B:
Figure 6A:
FIGS 6(a) and 6(b) illustrate, respectively, the partial and completed installation of the splice components of FIG. 5 on abutting cable sections.
Figure 6B:

An alternative embodiment of the invention having utility as a splice is depicted in FIGS. 5 and 6. Basically, this may be identical in construction to the dead-end embodiment above-described excepting that in the present case the appliance bight is omitted and the leg portions are separate components.

Specifically, as shown in FIGS. 5(a) and 5(b), respectively, the splice embodiment comprises first and second elongated leg portions 21 and 22 helically preformed to different pitch lengths. The leg 21 is of a significantly longer pitch than the leg 22 but both legs may otherwise be similarly constructed and be of the same or different internal diameter. In this regard, the internal diameter of each leg 21, 22 should be less than that of the linear body or cable sections about which it is intended to apply the splice in order that the legs effect a secure gripping of the cable sections.

Application of the splice components 21, 22 to abutting and co-axially aligned cable sections 24 and 24a is depicted in FIG. 6. As shown in FIG. 6(a), the longer pitch leg 21 is preferably applied first about the cable sections and is located so as to extend in equal directions from the juncture of cable sections 24, 24a. It has been found that application of the longer pitch leg first facilitates application of the shorter pitch leg.

The shorter pitch leg 22 is wrapped about the subassembly of the cable sections and the leg 21 and likewise extends an approximately equal distance in either direction from the cable juncture. Preferably, at least the underlying leg portion 21 is formed of a flat ribbon stock to provide a suitably uniform contour for application of the second leg and for providing a substantial surface contact and gripping area between the cable and legs 21, 22.

Like the dead-end version, it is desired that the legs 21, 22 of the splice be of an opposite hand of lay. Also, the legs of the splice may be constructed in any of the alternative forms previously discussed in connection with description of the dead-end embodiment.

While particular embodiments of the present invention have been shown and described, it is apparent that various changes and modifications may be made, and it is therefore intended in the following claims to cover all such modifications and changes as may fall within the true spirit and scope of this invention.

I claim:

1. A helically preformed appliance comprising:
   a first elongated leg portion helically preformed to a first predetermined pitch length;
   a second elongated leg portion helically preformed to a second predetermined pitch length different from said first predetermined pitch length; and
   a return bent bight portion joining said first and second leg portions.

2. The appliance of claim 1 in which the hand of lay of said first leg portion is opposite to the hand of lay of said second leg portion.

3. The appliance of claim 2 in which at least the one of said first and second leg portions having the greater pitch length is composed of a flat, ribbon-like material.

4. A helically preformed appliance for securely gripping a linear body, comprising:
   a first elongated leg portion helically preformed to a first predetermined pitch length for wrapping about said linear body in tightly encircling and gripping relation there-with;
   a second elongated leg portion helically preformed to a second predetermined pitch length substantially shorter than said first predetermined pitch length for wrapping about said linear body and said first helical leg portion in tightly encircling and gripping relation therewith; and
   a return bent bight portion positioned intermediate and integral with said first and second leg portions.

5. The appliance of claim 4 in which said first and second leg portions are formed with opposite hands of lay.

6. The appliance of claim 5 in which at least said first leg portion is composed of a flat, ribbon-like material.

7. The appliance of claim 6 in which said second leg and said return bent portions are composed of a flat, ribbon-like material.

8. The appliance of claim 4 in which said first and second leg portions are formed with like hands of lay.

9. A helically preformed appliance for securely gripping a linear body, comprising:
   a first elongated leg portion helically preformed to a first predetermined pitch length;
   a second elongated leg portion helically preformed to a second predetermined pitch length substantially shorter than said first predetermined pitch length, said first and second helical leg portions being wrapped about said linear body in overlying relation and in tightly encircling and gripping relation to said linear body.

10. The appliance of claim 9 in which said first and second leg portions are separate from one another and in which said linear body is composed of a pair of abutting sections with said first and second leg portions serving to splice said abutting sections together.

11. The appliance of claim 10 in which the hand of lay of said first leg portion is opposite to the hand of lay of said second leg portion.

12. The appliance of claim 11 in which at least the one of said first and second leg portions having the greater pitch length is composed of a flat, ribbon-like material.

13. The appliance of claim 9 and further including a return bent bight portion joining said first and second leg portions.

* * * * *